(12) United States Patent
Lee et al.

(10) Patent No.: US 12,030,140 B2
(45) Date of Patent: Jul. 9, 2024

(54) LEAD-FREE SOLDER ALLOY AND METHOD OF MANUFACTURING ELECTRONIC DEVICE USING THE SAME

(71) Applicant: MK ELECTRON CO., LTD., Yongin-si (KR)

(72) Inventors: Young Woo Lee, Gyeonggi-do (CN); Seul Gi Lee, Yongin-si (KR); Hui Joong Kim, Yongin-si (KR); Jae Yool Son, Yongin-si (KR); Jae Hun Song, Yongin-si (KR); Jeong Tak Moon, Suwon-si (KR)

(73) Assignee: MK ELECTRON CO., LTD. (KR)

( * ) Notice: Subject to any disclaimer, the term of this patent is extended or adjusted under 35 U.S.C. 154(b) by 0 days.

(21) Appl. No.: 17/959,502

(22) Filed: Oct. 4, 2022

(65) Prior Publication Data

US 2023/0111798 A1 Apr. 13, 2023

(30) Foreign Application Priority Data

Oct. 7, 2021 (KR) .................. 10-2021-0133446

(51) Int. Cl.
| | | |
|---|---|---|
| *B23K 35/26* | (2006.01) | |
| *C22C 12/00* | (2006.01) | |
| *C22C 13/02* | (2006.01) | |
| *B23K 20/00* | (2006.01) | |
| *B23K 101/36* | (2006.01) | |

(52) U.S. Cl.
CPC .......... *B23K 35/264* (2013.01); *B23K 35/262* (2013.01); *C22C 12/00* (2013.01); *C22C 13/02* (2013.01); *B23K 20/00* (2013.01); *B23K 2101/36* (2018.08)

(58) Field of Classification Search
CPC .................................................. C22C 12/00
See application file for complete search history.

(56) References Cited

U.S. PATENT DOCUMENTS

| | | | |
|---|---|---|---|
| 6,184,475 B1 | 2/2001 | Kitajima et al. | |
| 9,402,321 B2 | 7/2016 | Shimamura et al. | |
| 2019/0144975 A1* | 5/2019 | Marya | E21B 33/13 |
| | | | 420/577 |
| 2019/0262951 A1 | 8/2019 | Pandher et al. | |
| 2020/0070287 A1* | 3/2020 | Mutuku | C22C 30/06 |
| 2021/0001431 A1* | 1/2021 | Yokoyama | B23K 35/025 |

FOREIGN PATENT DOCUMENTS

| | | | |
|---|---|---|---|
| CN | 1927525 A * | 3/2007 | |
| JP | H08-150493 A | 6/1996 | |
| KR | 10-2015-0048208 A | 5/2015 | |
| KR | 10-2045951 | 11/2019 | |
| KR | 10-2020-0091932 A | 7/2020 | |
| WO | WO-2019171710 A1 * | 9/2019 | ......... B23K 35/0244 |

OTHER PUBLICATIONS

Office Action and English translation for corresponding KR Patant Application No. 10-2021-0133446, dated May 12, 2023, 10 pages.
Office Action (no English translation is available) for corresponding Taiwanese Patent Application No. 111137882, mailed Dec. 26, 2023, 5 pages.
Chen, Xu, et al."Effect of In on microstructure, thermodynamic characteristic and mechanical properties of Sn-Bi based lead-free solder" Journal of Alloys and Compounds, 2015, 633;377-383.
Office Action and English translation for Korean Application No. 10-2021-0133446, dated Jan. 29, 2024, 10 pages.

* cited by examiner

*Primary Examiner* — Jophy S. Koshy
(74) *Attorney, Agent, or Firm* — Crowell & Moring LLP (57) ABSTRACT

A lead-free solder alloy includes bismuth (Bi), content of which is equal to or greater than 56 wt % and equal to or less than 57.5 wt %, indium (In), content of which is equal to or greater than 0.05 wt % and equal to or less than 1.0 wt %, and the balance of tin (Sn) and another unavoidable impurity. The lead-free solder alloy of the disclosure may enable bonding with improved ductility and thermal shock reliability while not having a large melting point change compared to an Sn-58Bi alloy.

7 Claims, 12 Drawing Sheets

BEFORE THERMAL SHOCK TEST

AFTER THERMAL SHOCK TEST

FIG. 9

COMPARATIVE EXAMPLE 7

EMBODIMENT 3

FIG. 10

EMBODIMENT 3

EMBODIMENT 4

LEAD-FREE SOLDER ALLOY AND METHOD OF MANUFACTURING ELECTRONIC DEVICE USING THE SAME

CROSS-REFERENCE TO RELATED APPLICATION

This application is based on and claims priority under 35 U.S.C. § 119 to Korean Patent Application No. 10-2021-0133446, filed on Oct. 7, 2021, in the Korean Intellectual Property Office, the disclosure of which is incorporated by reference herein in its entirety.

BACKGROUND

1. Field

One or more embodiments relate to a lead-free solder alloy and a method of manufacturing an electronic device using the same, and more particularly, to a lead-free solder alloy having improved ductility and thermal shock reliability while not having a large melting point change compared to an Sn-58Bi alloy and a method of manufacturing an electronic device using the lead-free solder alloy.

2. Description of the Related Art

As the performance of semiconductor products has been improved, surface-mount technology has been widely used. When a reflow process of a bonding process is performed at a temperature of 200° C. or less, yield improvement may be expected.

Although various alloy compositions have been suggested to keep a reflow temperature below 200° C. when surface-mount technology is applied, there is a need for further improvement in ductility and thermal shock reliability.

SUMMARY

One or more embodiments include a lead-free solder alloy having improved ductility and thermal shock reliability while not having a large melting point change compared to an Sn-58Bi alloy.

One or more embodiments include a method of manufacturing an electronic device using the lead-free solder alloy.

Additional aspects will be set forth in part in the description which follows and, in part, will be apparent from the description, or may be learned by practice of the presented embodiments.

According to one or more embodiments, a lead-free solder alloy includes bismuth (Bi), content of which is equal to or greater than 56 wt % and equal to or less than 57.5 wt %, indium (In), content of which is equal to or greater than 0.05 wt % and equal to or less than 1.0 wt %, and the balance of tin (Sn) and another unavoidable impurity, wherein the lead-free solder alloy does not include silver (Ag).

The lead-free solder alloy may not include nickel (Ni). A sum of the contents of Bi and In in the lead-free solder alloy may range from 57 wt % to 58.2 wt %. The sum of the contents of Bi and In in the lead-free solder alloy may range from 57.8 wt % to 58.2 wt %. A ratio (i.e., $X_2/X_1$) of the content of In (wt %) ($X_2$) to the content of Bi (wt %) ($X_1$) in the lead-free solder alloy may range from $1.0\times10^{-3}$ to $1.8\times10^{-2}$.

The lead-free solder alloy may further include at least one selected from germanium (Ge), phosphorus (P), and gallium (Ga), wherein total content of the at least one selected from germanium, phosphorus, and gallium is equal to or greater than 5 ppm and equal to or less than 500 ppm by weight.

A melting point may range from about 134° C. to about 140° C.

According to one or more embodiments, a method of manufacturing an electronic device includes providing a first substrate to which a solder ball including the lead-free solder alloy is attached, providing solder paste on a bonding pad of a second substrate, and coupling the first substrate to the second substrate, by bringing the solder ball into contact with the solder paste and then reflowing the solder ball, wherein the solder paste includes bismuth (Bi), content of which is equal to or greater than 57 wt % and equal to or less than 58 wt %, and the balance of tin (Sn) and another unavoidable impurity.

The solder paste may not include silver (Ag). The solder paste may further include silver (Ag), content of which is equal to or greater than 0.005 wt % and equal to or less than 1.0 wt %.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

Hereinafter, preferred embodiments of the disclosure will be described in detail with reference to the accompanying drawings. The disclosure may, however, be embodied in many different forms and should not be construed as being limited to the embodiments set forth herein; These embodiments are provided so that this disclosure will be thorough and complete, and will fully convey the concept of the disclosure to one of ordinary skill in the art. Like reference numerals denote like elements throughout. Furthermore, various elements and regions in the drawings are schematically illustrated. Accordingly, the inventive concept is not limited by a relative size or interval illustrated in the drawings.

It will be understood that although the terms "first," "second," etc. may be used herein to describe various components, these components should not be limited by these terms. These terms are only used to distinguish one component from another. For example, a first element may be named a second element and conversely a second element may be named a first element without departing from the scope of the inventive concept.

The terms used in the present application are merely used to describe specific embodiments, and are not intended to limit the inventive concept. The singular forms "a," "an," and "the" are intended to include the plural forms as well, unless the context clearly indicates otherwise. Further, as used in this application, the terms "include," "have" and their conjugates may be construed to denote a certain feature, number, step, operation, constituent element, component, or a combination thereof, but may not be construed to exclude the existence or addition of one or more other features, numbers, steps, operations, constituent elements, components, or combinations thereof.

All terms including technical and scientific terms used herein have meanings which may be generally understood by one of ordinary skill in the art, if the terms are not particularly defined. General terms defined by dictionaries should be understood to have meanings which may be contextually understood in the art and should not have ideally or excessively formal meanings, if the terms are not defined particularly herein by the disclosure.

When a certain embodiment may be implemented differently, a specific process order may be different from the described order. For example, two consecutively described processes may be performed substantially at the same time or may be performed in an order opposite to the described order.

In the attached drawings, variations from shapes of the illustrations as a result, for example, of manufacturing techniques and/or tolerances, are to be expected. Thus, embodiments of the disclosure should not be construed as limited to the particular shapes of regions illustrated herein but may be to include deviations in shapes that result, for example, from manufacturing. As used herein, the term "and/or" includes any and all combinations of one or more of the associated listed items. Also, the term "substrate" used herein may refer to a substrate itself or a stacked structure including a substrate and a certain layer or film formed on a surface of the substrate. Also, the term "surface of a substrate" used herein may refer to an exposed surface of a substrate itself, or an outer surface of a certain layer or film formed on a substrate.

According to an embodiment of the disclosure, there is provided a lead-free solder alloy including bismuth (Bi), the content of which is equal to or greater than about 56 wt % and equal to or less than about 57.5 wt %, indium (In), the content of which is equal to or greater than about 0.05 wt % and equal to or less than about 1.0 wt %, and the balance of tin (Sn) and another unavoidable impurity.

The term "unavoidable impurity" may refer to an impurity that is not intentionally added but is unintentionally added in a manufacturing process, and may be an impurity of which the content h is less than about 0.1 wt %.

The lead-free solder alloy may not include silver (Ag). When the lead-free solder alloy does not include Ag, it does not mean that the lead-free solder alloy does not include Ag as an unavoidable impurity. Accordingly, the lead-free solder alloy may include Ag contained as an unavoidable impurity.

When the content of Bi in the lead-free solder alloy exceeds the range, a melting point of the lead-free solder alloy may excessively increase. Also, when the content of In in the lead-free solder alloy exceeds the range; a melting point of the lead-free solder alloy may excessively decrease.

The content of Bi in the lead-free solder alloy may be about 56.0 wt %, about 56.1 wt %, about 56.2 wt %, about 56.3 wt %, about 56.4 wt %, about 56.5 wt %, about 56.6 wt %, about 56.7 wt %, about 56.8 wt %, about 56.9 wt %, about 57.0 wt %, about 57.1 wt %, about 57.2 wt %, about 57.3 wt %, about 57.4 wt %, or about 57.5 wt %, or in any range between the above values. For example, the content of Bi in the lead-free solder alloy may be about 56.0 wt % to about 57.5 wt %, about 56.1 wt % to about 57.4 wt %, about 56.2 wt % to about 57.3 wt %; about 56.3 wt % to about 57.2 wt %, about 56.4 wt % to about 57.1 wt %, about 56.5 wt % to about 57.0 wt %, about 56.6 wt % to about 56.9 wt %, or about 56.7 wt % to about 56.8 wt %, or in any range between the above values.

The content of In in the lead-free solder alloy may be about 0.05 wt %, about 0.08 wt %, about 0.10 wt %, about 0.15 wt %, about 0.20 wt %, about 0.25 wt %, about 0.30 wt %, about 0.35 wt %, about 0.40 wt %, about 0.45 wt %, about 0.50 wt %, about 0.55 wt %, about 0.60 wt %, about 0.65 wt %, about 0.70 wt %, about 0.75 wt %, about 0.80 wt %, about 0.85 wt %, about 0.90 wt %, about 0.95 wt %, or about 1.0 wt %; or in any range between the above values. For example, the content of In in the lead-free solder alloy may be about 0.05 wt % to about 1.0 wt %; about 0.08 wt % to about 0.95 wt %, about 0.10 wt % to about 0.90 wt %, about 0.15 wt % to about 0.85 wt %, about 0.20 wt % to about 0.80 wt %, about 0.25 wt % to about 0.75 wt %, about 0.30 wt % to about 0.70 wt %, about 0.35 wt % to about 0.65 wt %, about 0.40 wt % to about 0.60 wt %, or about 0.45 wt % to about 0.55 wt %, or in any range between the above values.

In some embodiments, a sum of the contents of Bi and In may be about 57.0 wt % to about 58.5 wt %, about 57.2 wt % to about 58.4 wt %, about 57.4 wt % to about 58.3 wt %, about 57.6 wt % to about 58.2 wt %, about 57.8 wt % to about 58.2 wt %, or about 57.8 wt % to about 58.0 wt %, or in any range between the above values. When a sum of the contents of Bi and In exceeds the range, a melting point of the lead-free solder alloy may excessively increase.

In some embodiments, a ratio (i.e., $X_2/X_1$) of the content of In (wt %) ($X_2$) to the content of Bi (wt %) ($X_1$) may range from about $1.0 \times 10^{-3}$ to about $1.8 \times 10^{-2}$. When a ratio of the content of In to the content of Bi exceeds the range, thermal shock reliability may be degraded.

In some embodiments, the lead-free solder alloy may not include nickel (Ni). When the lead-free solder alloy does not include Ni, it does not mean that the lead-free solder alloy does not include Ni as an unavoidable impurity. Accordingly, the lead-free solder alloy may include Ni contained as an unavoidable impurity.

A melting point of the lead-free solder alloy may range from about 134° C. to about 140° C. In some embodiments, a melting point of the lead-free solder alloy may be about 134° C. to about 140° C., about 134.5° C. to about 138° C., about 135.0° C. to about 137.5° C., about 135.3° C. to about 137° C., about 135.5° C. to about 136.5° C., or about 135.7° C. to about 136.0° C., or in any range between the above values. When a melting point of the lead-free solder alloy exceeds the range, other solder bonding conditions may greatly change, which is economically disadvantageous.

In some embodiments, an absolute value of a difference between a melting point of the lead-free solder alloy and a melting point of a solder alloy that is (58 wt % Bi)-(the balance of Sn) may be equal to or less than about 3° C. In some embodiments, a value obtained by subtracting a melting point of the solder alloy that is (58 wt % Bi)-(the balance of Sn) from a melting point of the lead-free solder alloy may be 1.0° C. to 2.7° C., 1.3° C. to 2.5° C., 1.5° C. to 2.3° C., or 1.8° C. to 2.3° C., or in any range between the above values.

In some embodiments, the lead-free solder alloy may further include at least one selected from germanium (Ge), phosphorus (P), and gallium (Ga). The total content of the at least one selected from germanium, phosphorus, and gallium in the lead-free solder alloy may range from about 5 ppm to about 500 ppm by weight.

When the total content of at least one selected from germanium, phosphorus, and gallium in the lead-free solder alloy is too small, the effect of preventing oxidation of the tin component may be insufficient. When the total content of at least one selected from germanium, phosphorus, and gallium is too large, wetting performance for a pad may be degraded.

In some embodiments, the total content of at least one selected from germanium, phosphorus, and gallium may be about 5 ppm to about 500 ppm, about 10 ppm to about 400 ppm, about 20 ppm to about 300 ppm, or about 50 ppm to about 200 ppm, or in any range between the above values.

Figure 1:
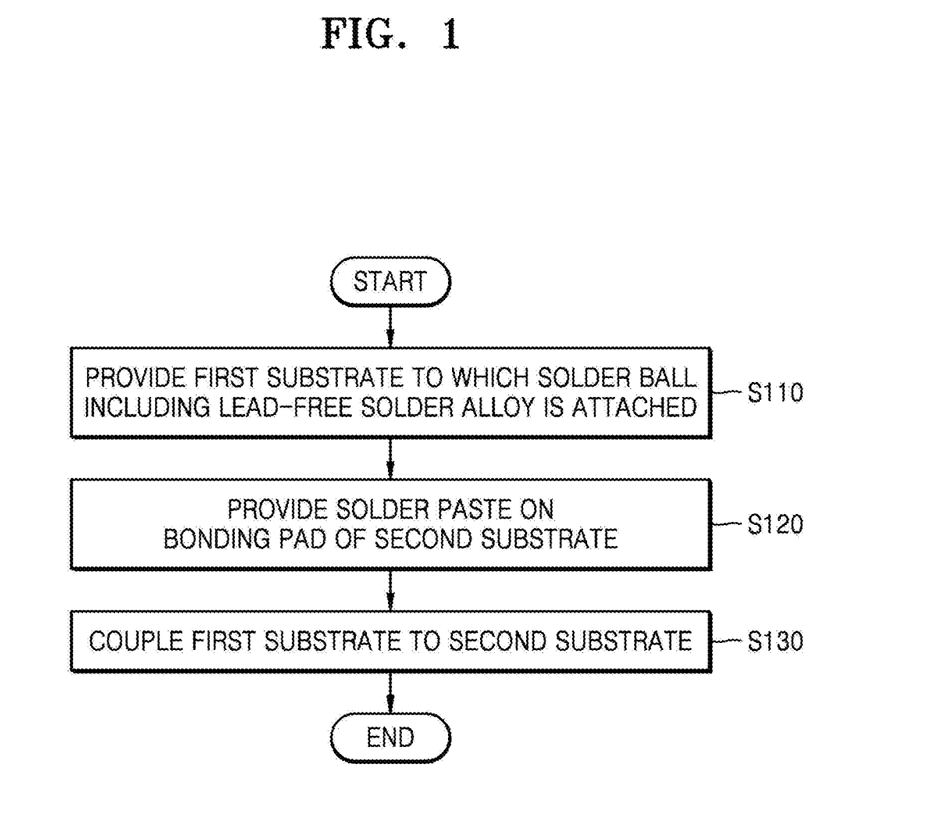
FIG. 1 is a flowchart illustrating a method of manufacturing an electronic device using a lead-free solder alloy of the disclosure.
Figure 2A:
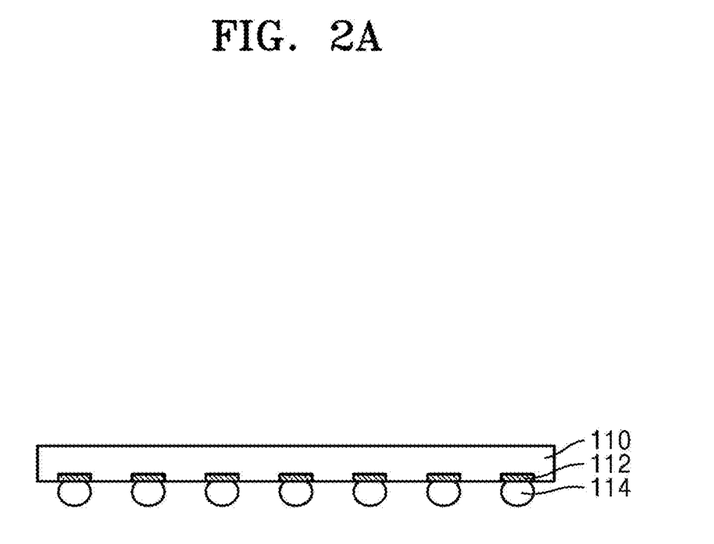
FIGS. 2A through 2C are side views illustrating a method of manufacturing an electronic device using a lead-free solder alloy of the disclosure.
Figure 2B:
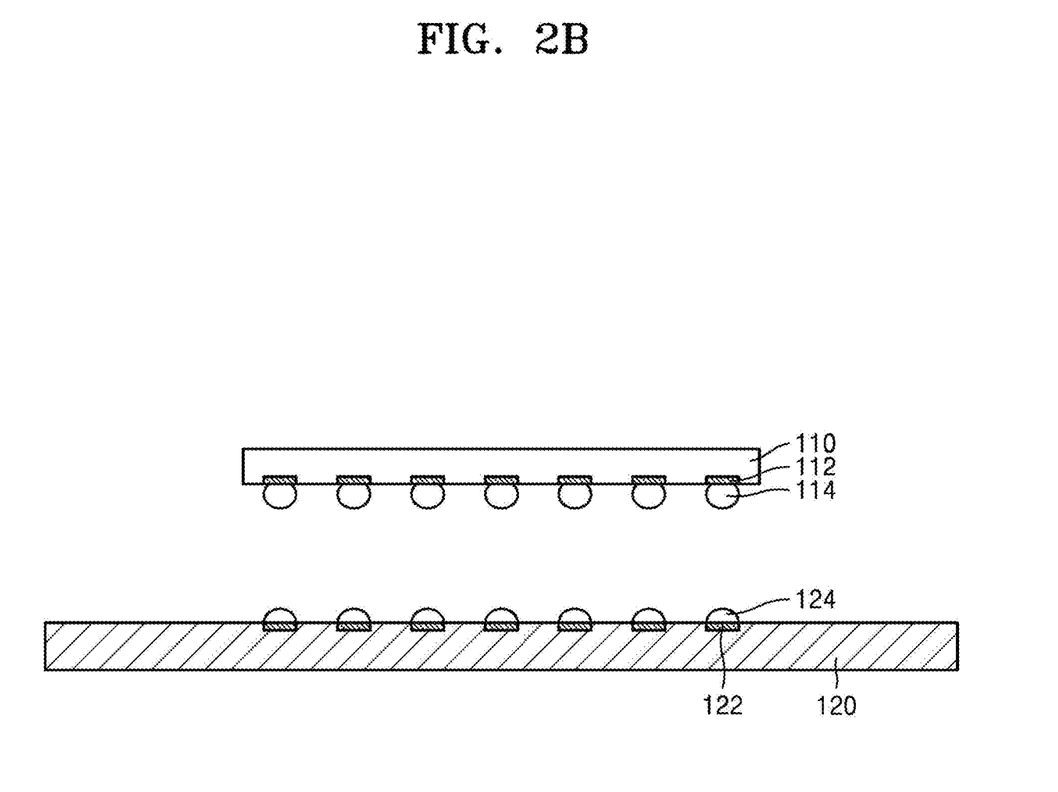
Figure 2C:
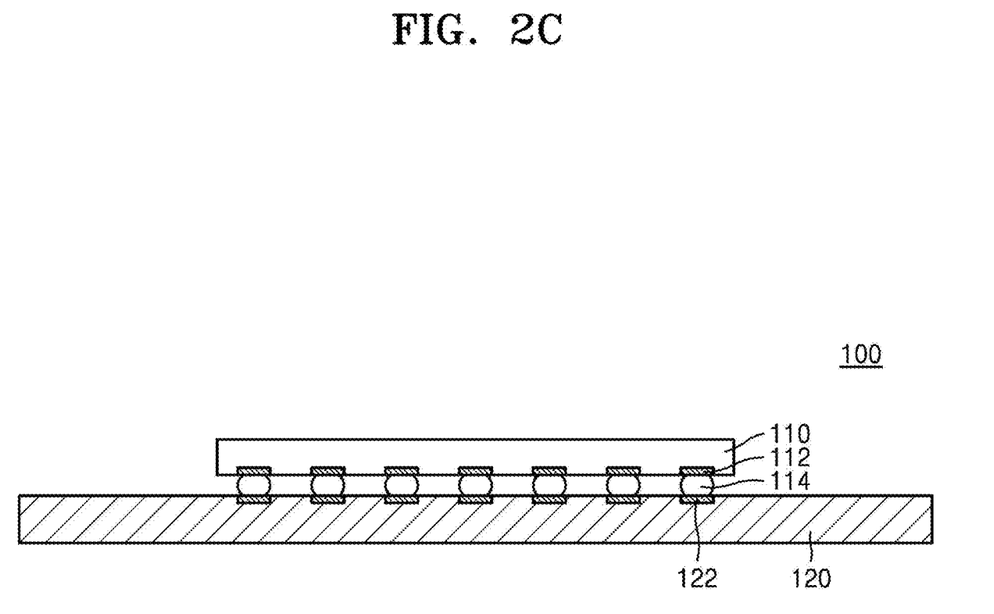

FIG. 1 is a flowchart illustrating a method of manufacturing an electronic device using a lead-free solder alloy of the disclosure. FIGS. 2A through 2C are side views illustrating a method of manufacturing an electronic device 100 using a lead-free solder alloy of the disclosure.

Referring to FIGS. 1 and 2A, a first substrate 110 to which solder balls 114 each including a lead-free solder alloy are attached is provided (S110).

In some embodiments, the first substrate 110 may be a semiconductor substrate. For example, the first substrate 110 may include a semiconductor element such as germanium (Ge), or a compound semiconductor such as silicon carbide (SiC), gallium arsenide (GaAs), indium arsenide (InAs), or indium phosphide (InP).

First bonding pads 112 may be provided on a surface of the first substrate 110. Each of the first bonding pads 112 may include at least one of aluminum (Al), copper (Cu), tantalum (Ta), titanium (Ti), tungsten (W), nickel (Ni), and gold (Au).

The solder ball 114 including the lead-free solder alloy may be attached to the first bonding pad 112.

Referring to FIGS. 1 and 2B, solder paste 124 is provided on second bonding pads 122 of a second substrate 120 (S120).

In some embodiments, the second substrate 120 may be a semiconductor substrate. For example, the first substrate 110 may include a semiconductor element such as germanium (Ge), or a compound semiconductor such as silicon carbide (SiC), gallium arsenide (GaAs), indium arsenide (InAs), or indium phosphide (InP)

In other embodiments, the second substrate 120 may be a printed circuit board (PCB).

The second bonding pads 122 may be provided on a surface of the second substrate 120. Each of the second bonding pads 122 may include at least one of Al, Cu, Ta, Ti, W, Ni, and Au.

In particular, the solder paste 124 may be provided on the second bonding pad 122. The solder paste 124 may include bismuth (Bi), the content of which is equal to or greater than about 57 wt % and equal to or less than about 58 wt %, and the balance of tin (Sn) and another unavoidable impurity.

In some embodiments, the solder paste 124 may include silver (Ag), the content of which ranges from about 0.005 wt % to about 1.5 wt %. In some embodiments, the content of Ag included in the solder paste 124 may be about 0.005 wt % to about 1.5 wt %, about 0.01 wt % to about 1.4 wt %, about 0.02 wt % to about 1.3 wt %, about 0.05 wt % to about 1.2 wt %, about 0.1 wt % to about 1.1 wt %, about 0.2 wt % to about 1.0 wt %, about 0.3 wt % to about 0.9 wt %, or about 0.5 wt % to about 0.8 wt %, or in any range between the above values.

When the content of Ag exceeds the range and is excessively large, thermal shock reliability may be degraded.

In some embodiments, the solder paste 124 may not include Ag. When the solder paste 124 does not include Ag, it does not mean that the solder paste 124 does not include Ag as an unavoidable impurity. Accordingly, the solder paste 124 may include Ag contained as an unavoidable impurity.

Referring to FIGS. 1 and 2C, the first substrate 110 and the second substrate 120 may be coupled to each other (S130). The first substrate 110 and the second substrate 120 may be coupled to each other by bringing the solder balls 114 of the first substrate 110 into contact with the second bonding pads 122 to which the solder paste 124 (see FIG. 2B) is applied and then reflowing and curing the solder balls 114.

The reflowing may be performed, for example, at a temperature of about 170° C. to about 200° C. for about 10 seconds to about 60 seconds.

Next, when necessary, an underfill may be formed between the first substrate 110 and the second substrate 120, and/or a molding portion surrounding the first substrate 110 may be further formed.

Hereinafter, while configurations and effects of the disclosure are described in more detail with reference to specific embodiments and comparative examples, these are only for better understanding of the disclosure and are not intended to limit the scope of the disclosure.

First, lead-free solder alloys having compositions shown in Table 1 were prepared and melting points were measured.

TABLE 1

|  | Bi (wt %) | In (wt %) | Ag (wt %) | Sn | Melting Point (° C.) |
|---|---|---|---|---|---|
| COMPOSITION A | 58 | 0 | 0 | balance | 138.19 |
| COMPOSITION B | 57.5 | 0.5 | 0 | balance | 137.65 |
| COMPOSITION C | 56.5 | 0.5 | 1.0 | balance | 137.13 |
| COMPOSITION D | 57 | 1 | 0 | balance | 135.85 |
| COMPOSITION E | 56 | 2 | 0 | balance | 133.63 |

The composition A is a composition that is widely used for a low-melting point solder ball. As shown in Table 1, each of melting points of the composition B through the composition D has a relatively small difference less than 3° C. from a melting point of the composition A. However, a melting point of the composition E has a difference greater than 4.5° C. from that of the composition A, and this degree of melting point difference may be unacceptable because it requires changes in characteristics of a semiconductor device itself and changes in various specifications for manufacturing semiconductor devices.

Ball Shear Strength Test

Lead-free solder alloys having the composition A (Comparative Example 1), the composition B (Embodiment 1), and the composition C (Comparative Example 2) were prepared and then solder balls having a diameter of 100 μm were manufactured. The solder balls were attached to a substrate and ball shear strengths were measured. A shear tip speed was set to 100 μm/sec and a shear tip height was set to 10 μm, and a result is shown in FIG. 3.

Figure 3:
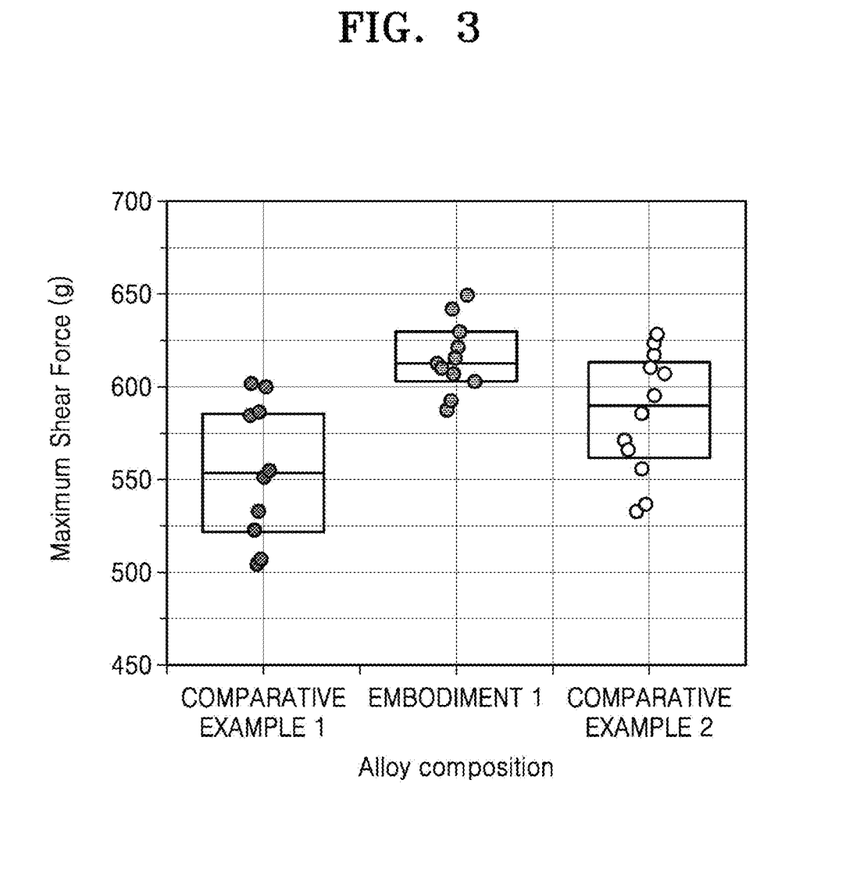
FIG. 3 is a graph illustrating a result of a ball shear strength test performed on lead-free solder alloys of Embodiment 1, Comparative Example 2, and Comparative Example 2.

As shown in FIG. 3, the solder ball of Embodiment 1 further including indium (In) showed a greatly higher ball shear strength than the solder ball of Comparative Example 1. The solder ball of Comparative Example 2 further including silver (Ag) showed a lower ball shear strength than the solder ball of Embodiment 1.

Thermal Shock Test

Solder balls having the composition A through the composition C and a composition F were prepared, and a thermal shock test was performed by applying various solder pastes. In detail, the composition F includes 4.0 wt % of silver, 0.5 wt % of copper, and the balance of tin, and the composition A through the composition C are as shown in Table 1. Compositions of the solder pastes are as shown in Table 2, and in Table 2, "SAC305" denotes a composition including 3.0 wt % of silver, 0.5 wt % of copper, and the balance of tin, "Sn-58Bi" denotes a composition including 58 wt % of bismuth and the balance of tin, and "Sn-58Bi-1Ag" denotes a composition including 57 wt % of bismuth, 1 wt % of silver, and the balance of tin.

Figure 4:
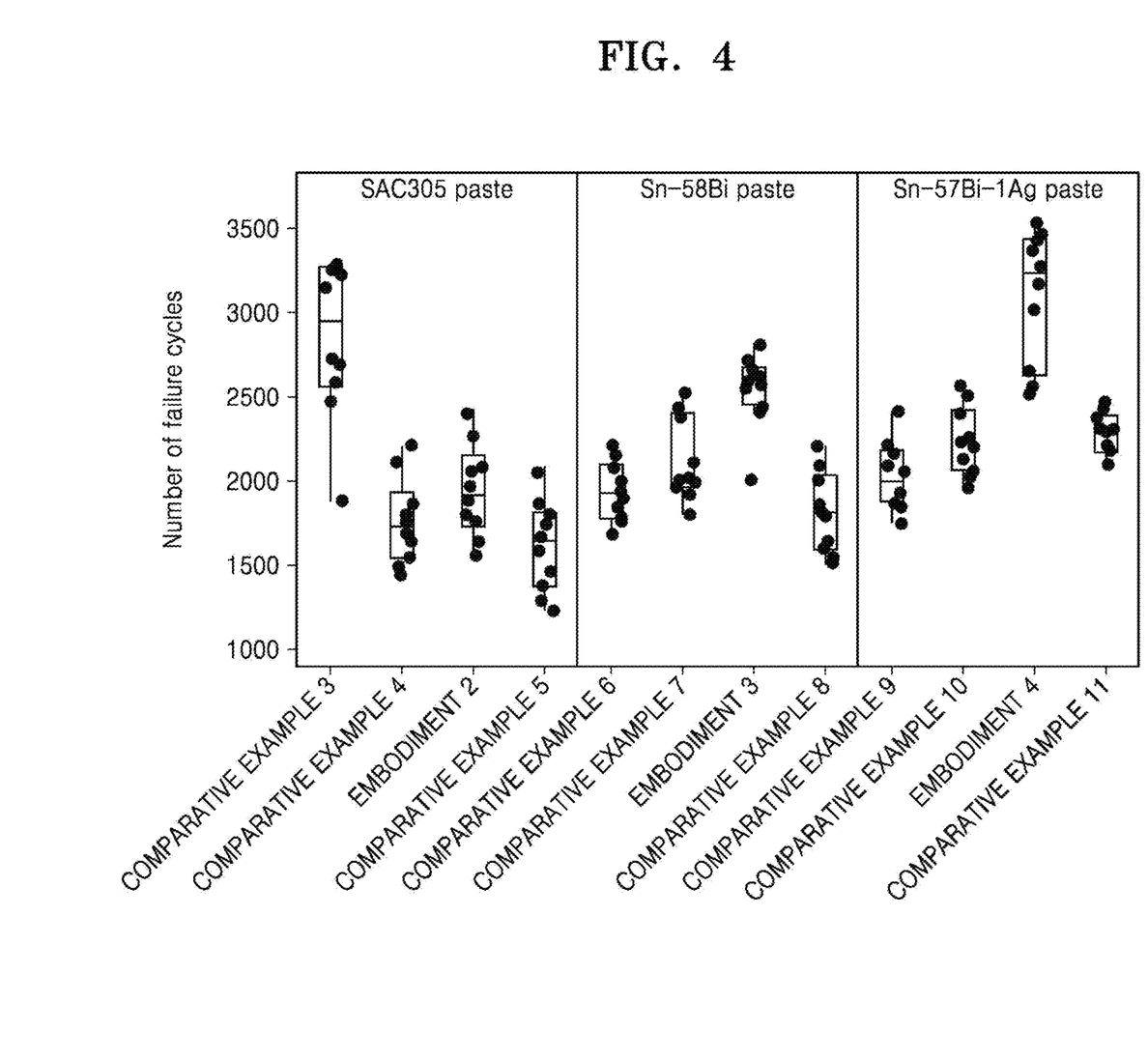
FIG. 4 is a graph illustrating a result of a thermal shock test performed on bonded structures of Embodiments 2 through 4 and Comparative Examples 3 through 11, particularly according to solder paste compositions.

A cycle in which structures bonded by using the solder balls and the solder pastes as shown in Table 2 are maintained at a temperature 40° C. for 30 minutes and then the temperature rapidly is increased to 100° C. and is maintained for 30 minutes was repeatedly performed. A result of the thermal shock test is shown in FIG. 4. Also, the number of cycles to first failure and the number of cycles to average failure in Embodiments and Comparative Examples are shown in Table 2.

TABLE 2

|  | SOLDER BALL | SOLDER PASTE | FIRST FAILURE (cycles) | AVERAGE FAILURE (cycles) |
|---|---|---|---|---|
| COMPARATIVE EXAMPLE 3 | COMPOSITION F | SAC305 | 1881 | 2837 |
| COMPARATIVE EXAMPLE 4 | COMPOSITION A | SAC305 | 1450 | 1755 |
| EMBODIMENT 2 | COMPOSITION B | SAC305 | 1560 | 1937 |
| COMPARATIVE EXAMPLE 5 | COMPOSITION C | SAC305 | 1234 | 1611 |
| COMPARATIVE EXAMPLE 6 | COMPOSITION F | Sn58Bi | 1684 | 1932 |
| COMPARATIVE EXAMPLE 7 | COMPOSITION A | Sn-58Bi | 1796 | 2110 |
| EMBODIMENT 3 | COMPOSITION B | Sn-58Bi | 2006 | 2528 |
| COMPARATIVE EXAMPLE 8 | COMPOSITION C | Sn-58Bi | 1521 | 1805 |
| COMPARATIVE EXAMPLE 9 | COMPOSITION F | Sn-57Bi-1Ag | 1746 | 2016 |
| COMPARATIVE EXAMPLE 10 | COMPOSITION A | Sn-57Bi-1Ag | 1955 | 2227 |
| EMBODIMENT 4 | COMPOSITION B | Sn-57Bi-1Ag | 2502 | 3079 |
| COMPARATIVE EXAMPLE 11 | COMPOSITION C | Sn-57Bi-1Ag | 2100 | 2289 |

Referring to FIG. 4 and Table 2, when matched with the solder paste having the composition of SAC 305 (Embodiment 2), the solder ball having the composition B showed relatively good thermal shock properties.

However, when used together with the solder paste having the composition of Sn-58Bi and the solder paste having the composition of Sn-57Bi-1Ag, the solder ball having the composition B showed much better thermal shock properties than the solder balls having the composition A, the composition C, and the composition F. In particular, when Embodiment 3 and Comparative Example 8 having a difference in whether 1.0% of silver is contained for the solder ball are compared with each other, it is found that thermal shock properties when silver is not contained (Embodiment 3) are much better than thermal shock properties when silver is contained (Comparative Example 8). This is also confirmed even when Embodiment 2 and Comparative Example 5 are compared with each other and Embodiment 4 and Comparative Example 11 are compared with each other.

Figure 5:
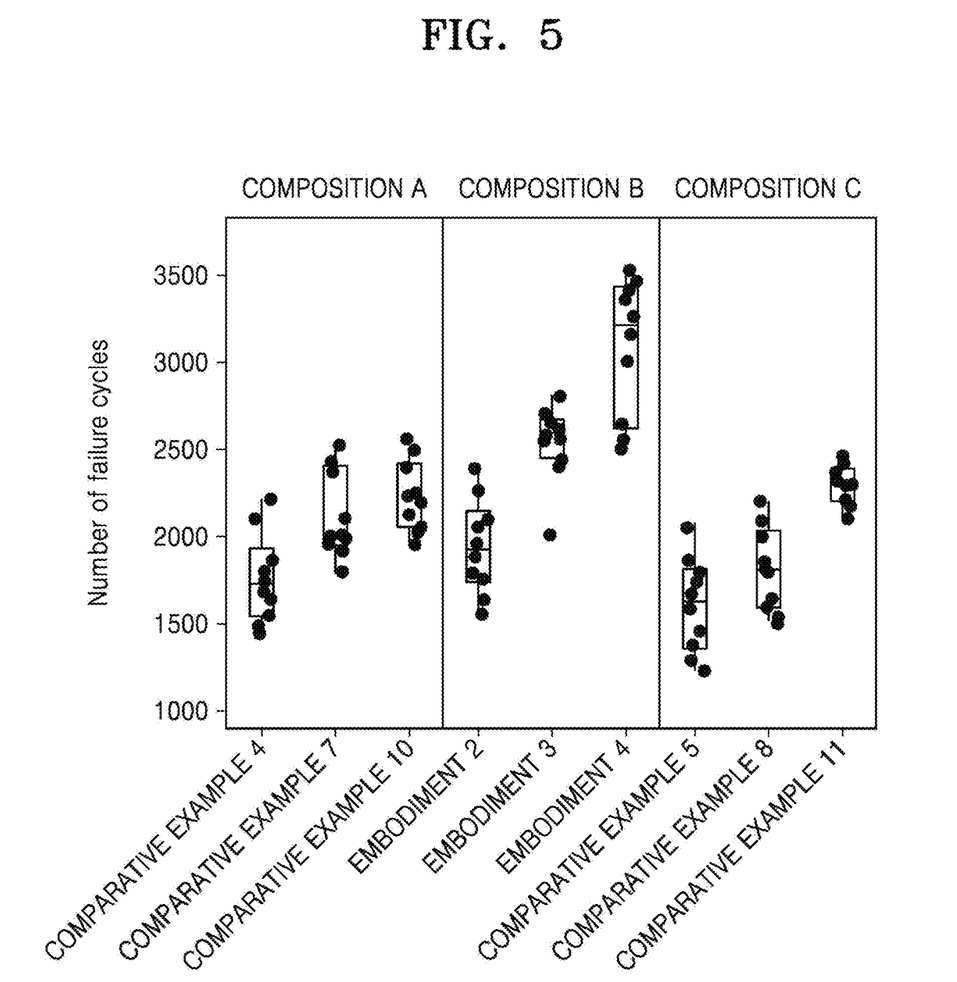
FIG. 5 is a graph illustrating a result of a thermal shock test performed on bonded structures of Embodiments 3 and 4 and Comparative Examples 6 through 11, particularly according to solder ball compositions.

The graph of FIG. 5 may be obtained from data of FIG. 4 and Table 2 in order to know a difference according to whether solder paste contains silver for a solder ball having a specific composition. Referring to FIG. 5 and Table 2, even when solder balls have the same composition, thermal shock properties when solder paste contains bismuth (Embodiments 3 and 4) are better than thermal shock properties when solder paste does not contain bismuth (Embodiment 2).

Figure 6A:
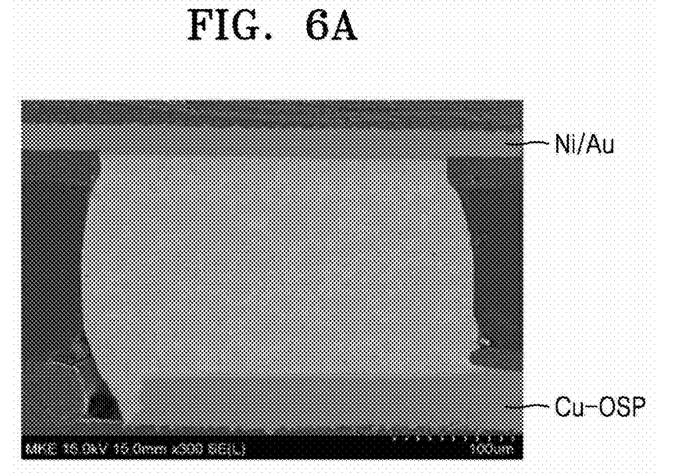
FIGS. 6A through SC are images showing cross-sections bonded using a solder ball and solder paste of Embodiment 2.
Figure 6B:
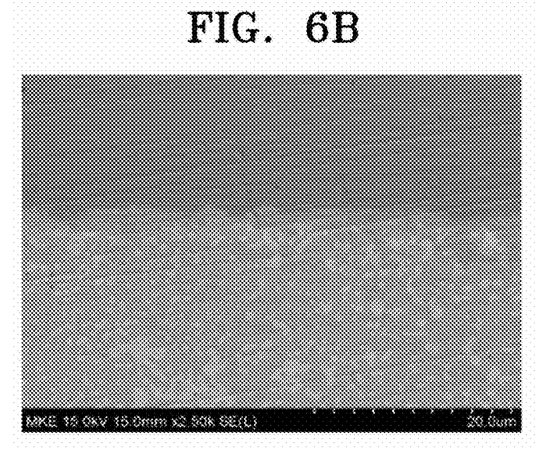
Figure 6C:
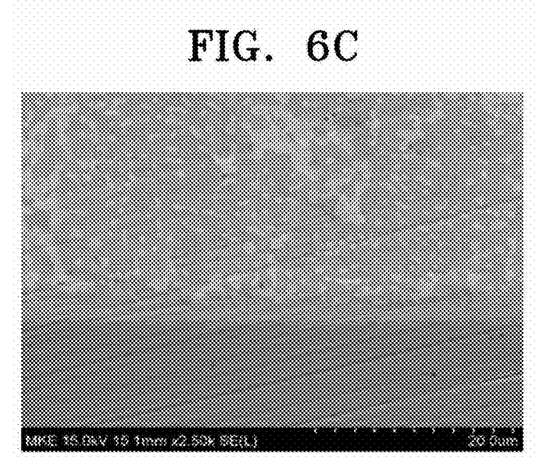

FIGS. 6A through 6C are images showing cross-sections bonded by using the solder ball and the solder paste of Embodiment 2. FIG. 6A is an image showing both bonding pads and a solder bump, and the upper bonding pad is a Ni/Au pad and the lower bonding pad is a Cu—OSP pad. FIG. 6B is an enlarged image showing an interface between the upper bonding pad and the solder bump. FIG. 6C is an enlarged image showing an interface between the lower bonding pad and the solder bump. In the solder bump, relatively bright portions are Bi crystal grains, and relatively dark portions are β-phase tin crystal grains. As shown in FIGS. 6A through 6C, the Bi crystal grains having fine sizes were densely distributed, which is presumed to be the influence of Ag. Also, it is observed that a relatively thick intermetallic compound layer including Ag$_3$Sn existed at an interface between the solder bump and the bonding pad.

Figure 7A:
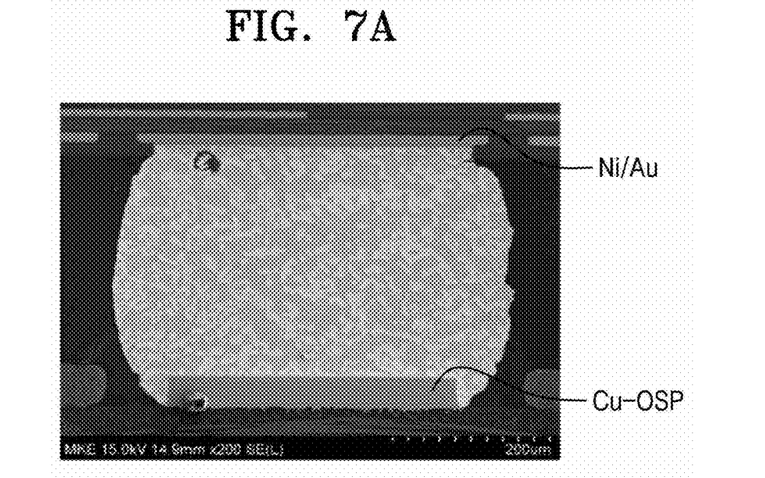
FIGS. 7A through 7C are images showing cross-sections bonded using a solder ball and solder paste of Embodiment 3.
Figure 7B:
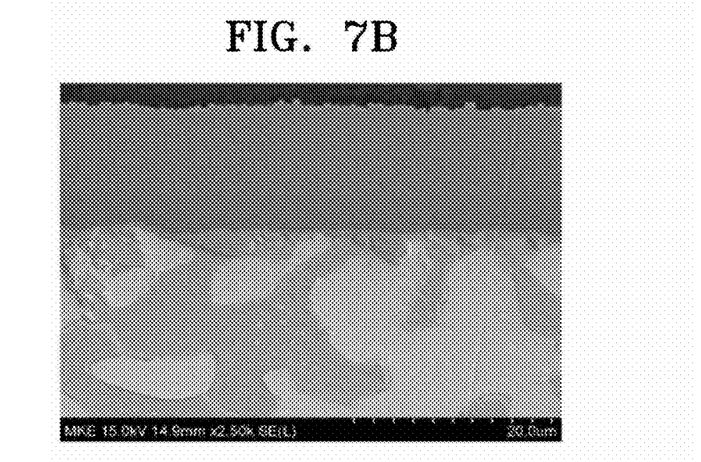
Figure 7C:
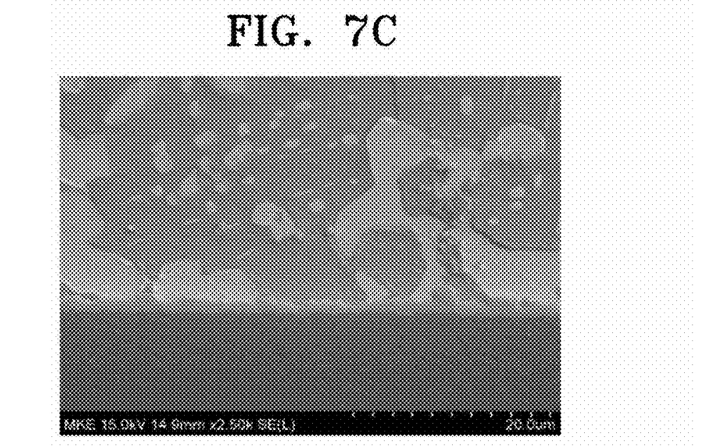

FIGS. 7A through 7C are images showing cross-sections bonded by using the solder ball and the solder paste of Embodiment 3. FIG. 7A is an image showing both bonding pads and a solder bump, and the upper bonding pad is a Ni/Au pad and the lower bonding pad is a Cu—OSP pad. FIG. 7B is an enlarged image showing an interface between the upper bonding pad and the solder bump. FIG. 7C is an enlarged image showing an interface between the lower bonding pad and the solder bump. Referring to FIGS. 7A through 7C, it is observed that a Bi crystal grain size was relatively large and an intermetallic compound layer had a relatively small thickness. An intermetallic compound including Ag$_3$Sn may increase brittleness. It is presumed that the intermetallic compound layer in Embodiment 3 had better thermal shock properties than in Embodiment 2 because the intermetallic compound layer in Embodiment 3 was thinner.

In particular, the Bi crystal grains of FIGS. 7A through 7C may have a larger average crystal grain size than the Bi crystal grains of FIGS. 6A through 6C. The number of Bi crystal grains in the bonding cross-section using the solder ball and the solder paste of Embodiment 2 of FIGS. 6A through 6C was counted as 169 (FIG. 6B) and 206 (FIG. 6C) with respect to a cross-sectional area of 50 μm×20 μm. Also, the number of Bi crystal grains in the bonding cross-section using the solder ball and the solder paste of Embodiment 3 of FIGS. 7A through 7C was counted as 14 (FIG. 7B) and 54 (FIG. 7C) with respect to a cross-sectional area of 50 μm×20 μm.

That is, the number of Bi crystal grains in the bonding cross-section using the solder ball and the solder paste of Embodiment 3 with respect to a cross-sectional area of 50 μm×20 μm may be about 100 or less, for example, about 5 to about 80, about 10 to about 70, or about 13 to about 60, or in any range between the above values. Because a number density of the Bi crystal grains was within the range, that is, a relatively small number of Bi crystal grains having a relatively large size were distributed, brittleness may be suppressed and/or elongation properties may be improved.

Also, it is found that even when solder paste contains bismuth, thermal shock properties when silver is further contained (Embodiment 4) are much better than thermal shock properties when silver is not contained (Embodiment 3). Such a result is in great contrast to a result according to whether a solder ball contains silver.

Although the disclosure is not limited by a specific theory, it is presumed that Embodiment 3 in which the solder ball did not contain silver had much better thermal shock properties than Comparative Example 8 in which the solder ball contained silver because, in Comparative Example 8, an Ag$_3$Sn compound overgrew in a thermal shock test and In was dissolved in Ag and did not exhibit a sufficient property enhancing effect. Such a relationship is also found between Embodiment 2 and Comparative Example 5 and between Embodiment 4 and Comparative Example 11.

Figure 8:
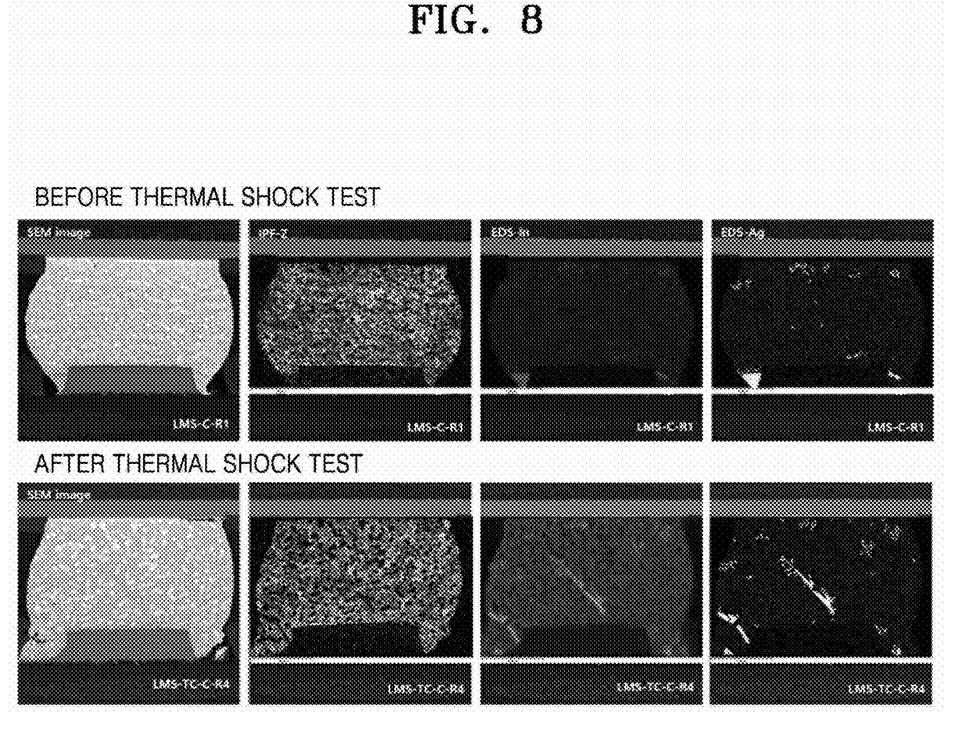
FIG. 8 illustrates a scanning electron microscope image, a crystal orientation distribution image, and indium (In) and silver (Ag) distribution images obtained through energy-dispersive X-ray spectroscopy (EDS) analysis before and after a thermal shock test of a cross-section bonded by using a solder ball having a composition C.

FIG. 8 illustrates a scanning electron microscope image, a crystal orientation distribution image, and In and Ag distribution images obtained through energy-dispersive X-ray spectroscopy (EDS) analysis before and after a thermal shock test of a cross-section bonded by using the solder ball and the solder paste of Comparative Example 8.

Referring to FIG. 8, it is found that a crystal grain size was generally increased after the thermal shock test, and particularly, it is observed that Ag was more concentrated in some areas after the thermal shock test than before the thermal shock test. Also, it is observed that In was also concentrated in the areas where the Ag was concentrated. Accordingly, it is highly likely that initial cracks occurred in the overgrown Ag$_3$Sn compound.

Figure 9:
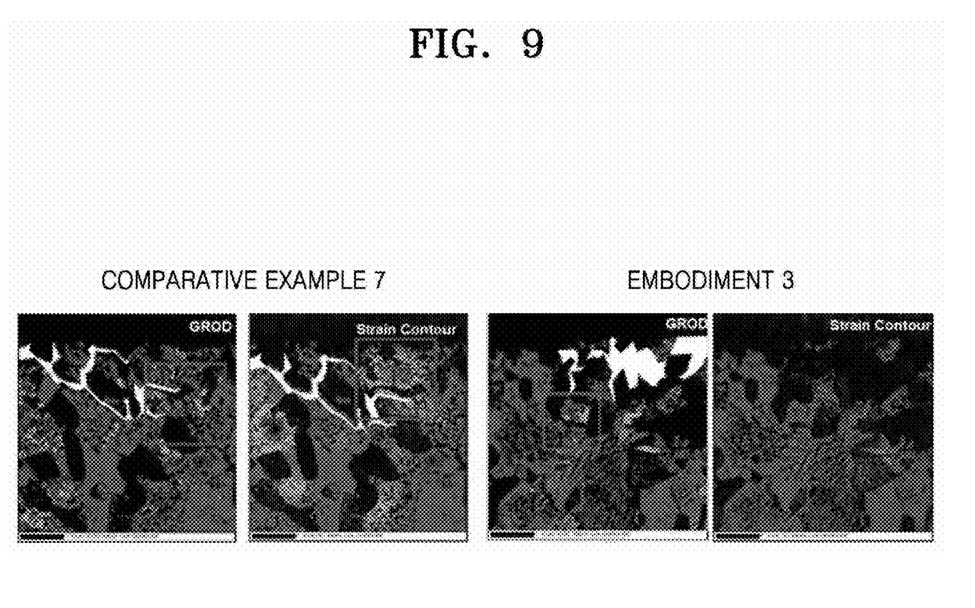
FIG. 9 illustrates images showing electron backscatter diffraction (EBSD) analysis results of cracked portions in bonding cross-sections of Comparative Example 7 and Embodiment 3.

FIG. 9 illustrates images showing electron backscatter diffraction (EBSD) analysis results of cracked portions in bonding cross-sections in Comparative Example 7 and Embodiment 3.

Referring to FIG. 9, it is observed that deformation was relatively uniform and small in the image of Embodiment 3, and deformation was locally concentrated in the image of Comparative Example 7.

Figure 10:
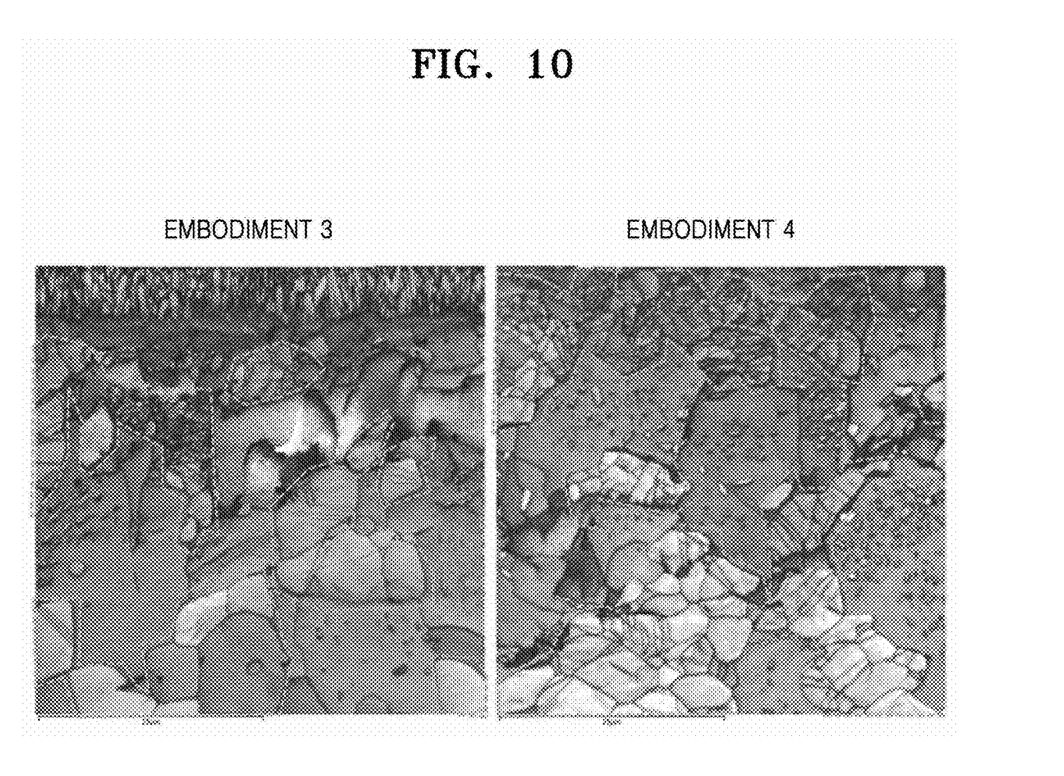
FIG. 10 illustrates cross-sectional images showing morphologies of bonding cross-sections of Embodiment 3 and Embodiment 4 after a thermal shock test.

FIG. 10 illustrates cross-sectional images showing morphologies of bonding cross-sections of Embodiment 3 and Embodiment 4 after a thermal shock test.

Referring to FIG. 10, it is presumed that Embodiment 4 showed better bonding properties than Embodiment 3 because the generation of twin structures of Bi crystal grains in Embodiment 4 was relatively delayed.

A lead-free solder alloy according to the disclosure may enable bonding with improved ductility and thermal shock reliability while not having a large melting point change compared to an Sn-58Bi alloy.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A lead-free solder alloy, consisting of:
   bismuth (Bi), content of which is equal to or greater than 56 wt % and equal to or less than 57.5 wt %;
   indium (In), content of which is equal to or greater than 0.05 wt % and equal to or less than 1.0 wt %;
   gallium (Ga) and at least one selected from germanium (Ge) and phosphorus (P), wherein total content of the gallium and the at least one selected from germanium and phosphorus is equal to or greater than 5 ppm and equal to or less than 500 ppm by weight; and
   a remaining balance consisting of tin (Sn) and any other unavoidable impurity,
   wherein the lead-free solder alloy does not have silver (Ag), and does not have copper (Cu).

2. The lead-free solder alloy of claim 1, wherein:
   the lead-free solder alloy does not have nickel (Ni).

3. The lead-free solder alloy of claim 1, wherein:
   a sum of the contents of Bi and In ranges from 57 wt % to 58.2 wt %.

4. The lead-free solder alloy of claim 3, wherein:
   the sum of the contents of Bi and In ranges from 57.8 wt % to 58.2 wt %.

5. The lead-free solder alloy of claim 1, wherein:
   a ratio $X_2/X_1$ of the content of In wt % $X_2$ to the content of Bi wt % $X_1$ ranges from $1.0 \times 10^{-3}$ to $1.8 \times 10^{-2}$.

6. The lead-free solder alloy of claim 1, wherein:
a melting point of the alloy ranges from 134° C. to 140° C.

7. A method of manufacturing an electronic device, the method comprising:
attaching to a first substrate a solder ball comprising the lead-free solder alloy according to claim 1;
providing solder paste on a bonding pad of a second substrate; and
coupling the first substrate to the second substrate, by bringing the solder ball into contact with the solder paste and then reflowing the solder ball.

\* \* \* \* \*

UNITED STATES PATENT AND TRADEMARK OFFICE
CERTIFICATE OF CORRECTION

| | |
|---|---|
| PATENT NO. | : 12,030,140 B2 |
| APPLICATION NO. | : 17/959502 |
| DATED | : July 9, 2024 |
| INVENTOR(S) | : Young Woo Lee et al. |

It is certified that error appears in the above-identified patent and that said Letters Patent is hereby corrected as shown below:

On the Title Page

Item (72)

Column 1, Line 1 In the Inventor Young Woo Lee's residence please delete "Gyeonggi-do (CN)" and replace with --Yongin-si, Gyeonggi-do (KR)--

Column 1, Line 3 In the Inventor Jae Yool Son's name please delete "Yool" and replace with --Yeol--

Signed and Sealed this
First Day of October, 2024

Katherine Kelly Vidal
*Director of the United States Patent and Trademark Office*